Oct. 9, 1928.
J. S. THOMPSON
FRICTION BRAKE
Filed Sept. 24, 1926   2 Sheets-Sheet 1
1,687,151
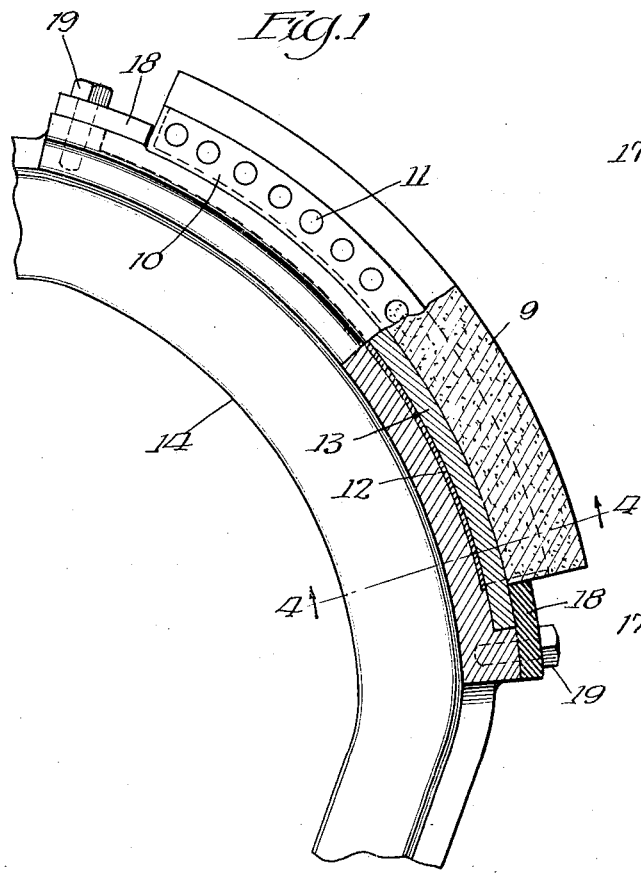
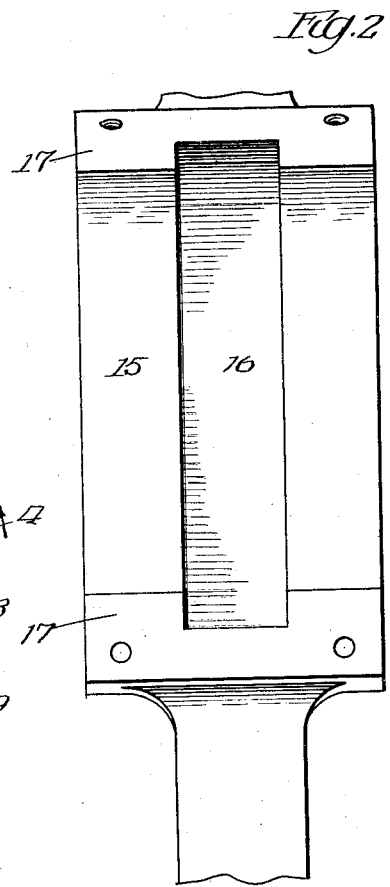
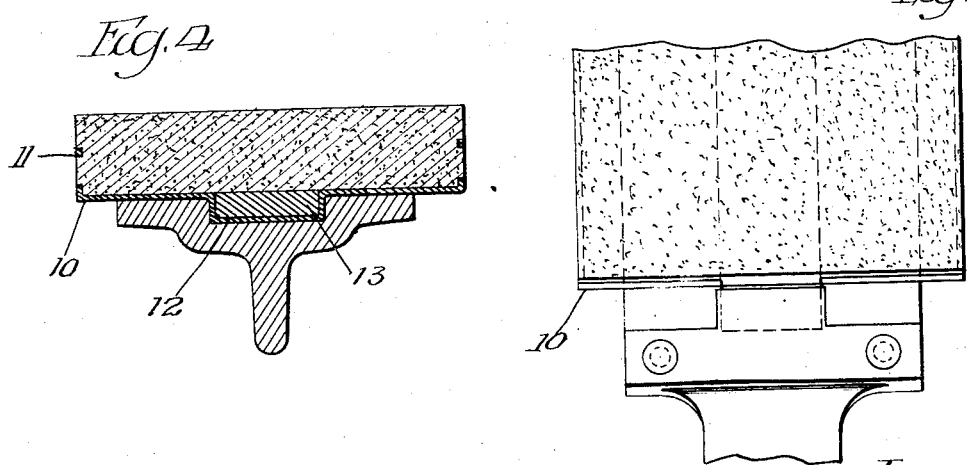

Oct. 9, 1928.  
J. S. THOMPSON  
FRICTION BRAKE  
Filed Sept. 24, 1926    2 Sheets-Sheet 2

1,687,151

Inventor  
James S. Thompson  
By Wm. O. Belt, Atty.

Patented Oct. 9, 1928.

1,687,151

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BRAKE.

Application filed September 24, 1926. Serial No. 137,415.

This invention relates generally to friction brakes and more particularly to the provision of a novel shoe for braking a moving member by frictional contact therewith. There are many different kinds of brake assemblies in which a shoe of this type may be employed, one being the internal expanding brake for automotive vehicles. In companion applications I have disclosed inventions relating to expanding and other brakes which are adapted for use with a shoe of this invention.

The object of the invention is, generally, to provide an efficient shoe for a friction brake, to reduce the cost of maintaining the brake in service, to enable an installation or replacement of the shoe to be performed easily and quickly, and to prolong the life of the shoe.

A further and more particular object of the invention is to provide novel and improved means on the shoe whereby the shoe may be easily fastened on a brake head or other support.

And a still further object of the invention is to provide a composition shoe having a metal back with a reinforcing bar or strip which extends lengthwise through the shoe and projects beyond the ends thereof to be engaged by means for fastening the shoe to its support.

In the accompanying drawings showing selected embodiments of the invention:

Fig. 1 is a side view, partly in section, illustrating a portion of a brake head with a shoe mounted thereon.

Fig. 2 is a plan view of that part of the head which is shown in Fig. 1, the shoe and fastening devices being removed.

Fig. 3 is a fragmentary plan view showing one end of a shoe and a portion of the head with which it is engaged.

Fig. 4 is a sectional view on the line 4—4 of Fig. 1.

Figure 5:
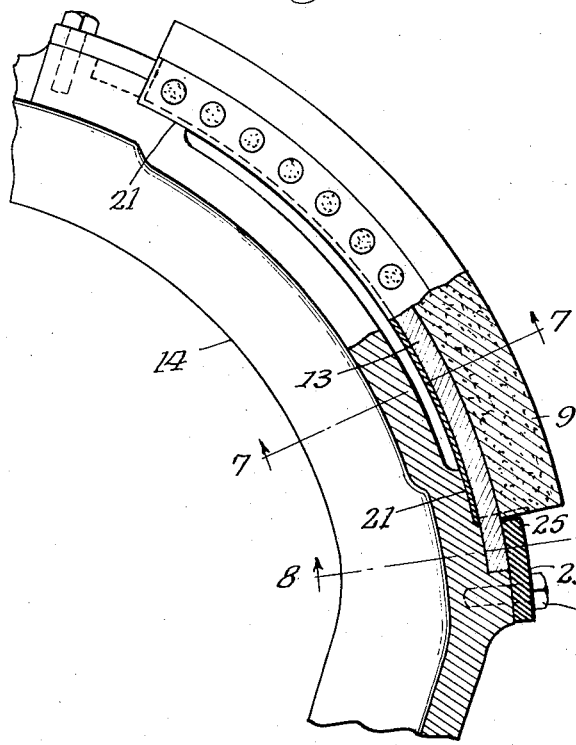
Fig. 5 is a view similar to Fig. 1 but showing another way of seating the shoe on the head and securing the shoe to the head.

Referring to the drawings, the body 9 of the shoe is made of a suitable composition which will provide friction for the intended purpose and which is wear and heat resistant. I do not claim the composition in this application because the invention herein claimed is not restricted to the use of a particular composition and any composition suitable for the purpose may be used with this invention. The body of the shoe will generally be made concavo-convex in shape to fit its support and to engage the part to be braked. A metal back is made fast to the concave back of the body in the form of the invention illustrated in the drawings. This back may be a shallow shell 10, the sides or the ends or both the sides and ends of which may have perforations 11 to receive the body material for anchoring the body to the shell. The back of the shell may also be perforated for the same purpose, if desired, and any other means may be employed for anchoring the body to the shell.

The shell is provided with a longitudinal channel at its back which extends through the ends of the shell to receive a bar 13 which projects beyond the ends of the shell. This bar is preferably made to fit snugly in the channel and it projects beyond the ends of the shoe sufficiently to be engaged by fastening devices which secure the shoe on its support.

14 designates the head of an internal expanding brake and it is provided with a seat 15 for the shoe comprising a recess 16 adapted to receive the channel portion 12 of the back of the shell and the bar 13. At the ends of the seat 15 there are shoulders 17 against which the ends of the shoe abut, and plates 18 are secured on these shoulders and over the projecting ends of the bar by bolts 19 whereby the shoe is securely fastened to the head. The plates abut against the ends of the shoe and the ends of the bar abut against the end walls of the recess 16 in the shoulders 17 and the ends of the shoe engage the shoulders 17 so that movement of the shoe relative to the head is prevented.

Figure 6:
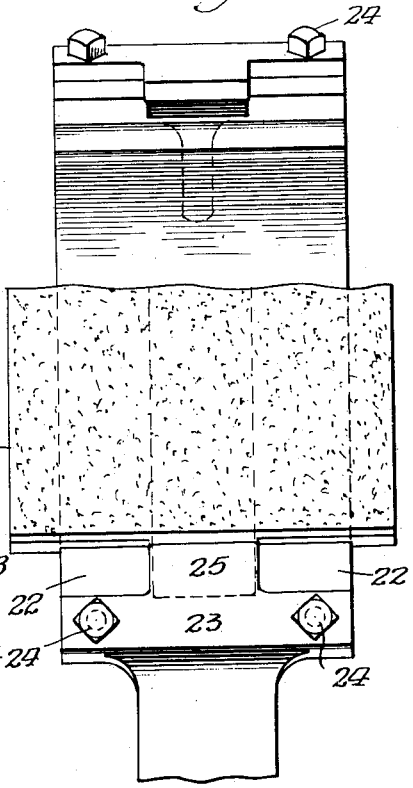
Fig. 6 is a plan view of Fig. 5, a portion of the shoe being broken away.
Figure 7:
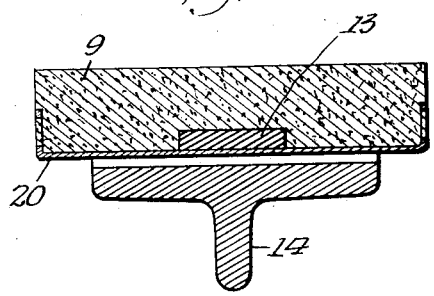
Fig. 7 is a sectional view on the line 7—7 of Fig. 5.
Figure 8:
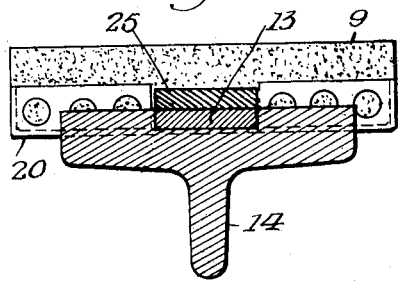
Fig. 8 is a sectional view on the line 8—8 of Fig. 5.

In the embodiment of my invention shown in Figs. 5 to 8 the back of the shell 20 is not channeled and the bar 13 is seated within the body 9 of the shoe and upon the back 20 of the shell, as clearly shown in Fig. 7. The shoe may be supported on its seat only at its ends upon shoulders 21 (Fig. 5), there being a clearance between the shoe and the head 14 between said shoulders. In this construction there are integral end strops 22 spaced apart at each shoulder against which the ends of the shoe abut, and the ends of the bar 13 are seated between said end stops 22 (Fig. 6). The plates 23 are fastened to the head support by bolts 24 and they have projections 25 which project between the end stops 22 and overlap the ends of the bar 13.

The bar forms a convenient means to be engaged by the fastening devices for securing the shoe on the head. It can be made as strong and substantial and of as heavy section as may be desired. It can be arranged in a channel as shown in Figs. 1 to 4 or it can be arranged within the body against a flat back as shown in Figs. 5 to 8. The bar tends generally to reinforce and strengthen the shoe. It is intended to abut against parts of the head to assist in preventing movement of the shoe relative to the head. The bar can be spot-welded or otherwise made fast to the back whenever this is found to be necessary.

I have shown the invention in embodiments which will illustrate the invention and the manner of its use, but I do not thereby intend to restrict myself to the exact form, construction and arrangement of parts illustrated; and I reserve the right to make all such changes as fall within the scope of the following claims.

I claim:

1. As a new article of manufacture, a friction brake shoe comprising a composition body, a metal back on the body, and a bar extending lengthwise through the shoe and projecting beyond the ends thereof.

2. As a new article of manufacture, a friction brake shoe comprising a composition body, a metal back on the body, and a bar interposed between the body and the back and projecting beyond the ends thereof.

3. As a new article of manufacture, a friction brake shoe comprising a composition body, a metal back on the body having a longitudinal channel therein, and a bar seated in said channel and projecting beyond the ends thereof.

4. As a new article of manufacture, a friction brake shoe comprising a composition body having a convex friction contact face and a concave back face, a metal back secured on the concave back face of the body, and a bar curved to correspond with the curvature of the back face of the body and the metal back and interposed between the back and the body and projecting beyond the ends thereof.

5. As a new article of manufacture, a friction brake shoe comprising a composition body, a metal back in the form of a shell on the body, and a bar interposed between the back of the shell and the body and projecting beyond the ends of the shell and body.

6. As a new article of manufacture, a friction brake shoe comprising a composition body, a back in the form of a shell on the body and having a longitudinal channel between its sides, and a bar seated in said channel beneath the body and projecting beyond the ends of the shell and body.

7. As a new article of manufacture, a friction brake shoe comprising a metal back bent outwardly on parallel lines extending longitudinally of the back and approximately midway between its sides to form a channel on the inner face of the back, a bar seated in said channel and projecting beyond the ends thereof, and a body mounted on the back and over the bar.

8. The combination of a shoe comprising a body having a bar rigid therewith and projecting beyond the ends of the body, a support having a seat to receive the shoe and a recess in the seat to receive the bar, and means overlapping the ends of the bar for securing the shoe on the support.

9. The combination of a shoe comprising a composition body, a metal back on the body, a bar interposed between the back and the body and projecting beyond the ends thereof, a support having a seat for the shoe and a channel in said seat to accommodate said bar, and means overlapping the ends of the bar for securing the shoe on the seat.

10. The combination of a shoe comprising a body having a metal back with a channel therein, a bar seated in said channel and projecting beyond the ends of the body, a support having a seat to receive the shoe and a channel in said seat to accommodate the bar, stops on the support against which the ends of the shoe abut, and means overlapping the ends of the bar for securing the shoe to the support.

JAMES S. THOMPSON.